United States Patent
Bedingfield, Sr.

(10) Patent No.: US 8,345,848 B1
(45) Date of Patent: Jan. 1, 2013

(54) MULTI-CHANNEL TELEPHONY

(75) Inventor: James Carlton Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1285 days.

(21) Appl. No.: 11/847,619

(22) Filed: Aug. 30, 2007

(51) Int. Cl.
*H04M 11/00* (2006.01)
*H04M 3/42* (2006.01)
(52) U.S. Cl. ............. 379/202.01; 379/88.13; 379/93.01
(58) Field of Classification Search ............... 379/88.13, 379/93.01, 202.01
See application file for complete search history.

(56) References Cited

U.S. PATENT DOCUMENTS

| 6,453,022 B1* | 9/2002 | Weinman, Jr. | 379/88.13 |
| 6,850,496 B1* | 2/2005 | Knappe et al. | 370/260 |
| 2003/0039241 A1* | 2/2003 | Park et al. | 370/352 |
| 2003/0138080 A1* | 7/2003 | Nelson et al. | 379/88.16 |
| 2003/0219042 A1* | 11/2003 | Tosa | 370/540 |
| 2006/0153155 A1* | 7/2006 | Jacobsen et al. | 370/338 |
| 2007/0280209 A1* | 12/2007 | Ramani | 370/356 |
| 2008/0198779 A1* | 8/2008 | Jaermyr et al. | 370/290 |

* cited by examiner

*Primary Examiner* — Ahmad Matar
*Assistant Examiner* — Nafiz E Hoque
(74) *Attorney, Agent, or Firm* — Cantor Colburn LLP

(57) ABSTRACT

Techniques for providing multi-channel telephony are described herein. In different aspects, a multi-channel telephony apparatus may include a sound interface configured to process a multi-channel sound signal including at least one of causing speakers to emit multi-channel sound or receiving multi-channel sound from microphones and a network interface configured to transmit the multi-channel sound signal from the sound interface to one or more communication lines of a telephone network. In some aspects, a dialer may be configured with the network interface to establish a connection with the telephone network.

16 Claims, 7 Drawing Sheets

MULTI-CHANNEL TELEPHONY

CROSS REFERENCE TO RELATED APPLICATION

This patent application is related to co-pending, commonly-owned U.S. patent application Ser. No. 11/696,510 entitled "Methods and Systems for Synthetic Audio Placement" and is related to co-pending, commonly-owned U.S. patent application Ser. No. 11/696,540 entitled "Synthetic Audio Placement", both of which were filed concurrently on Apr. 4, 2007, and both of which are hereby incorporated by reference.

FIELD OF THE DISCLOSURE

The present disclosure relates to communications, and more specifically to providing multi-channel telephony.

BACKGROUND

Conferences are often conducted with multiple participants. A conference will typically include a number of different speakers throughout the duration of the conference. When attending a conference in person, a participant has the luxury of utilizing sensory information, including vision and the timbre effect of sound, to determine helpful information about the speaker. Unfortunately, face-to-face conferences are not always possible due to geographical or other constraints. Therefore, many conferences occur over communication systems, such as telephone systems configured for conference calling, or video conference systems.

Many communication systems are limited to transmitting single channel audio signals between users. Therefore, when conferences occur over typical communication systems, spatial reference is often lost through the single channel communication. It is often difficult to determine which participant is speaking during a conference call when multiple participants sound similar or when there are a large number of participants on the conference call. Accordingly, there is a continuing need to improve communication systems.

SUMMARY

Techniques for providing multi-channel telephony are described herein. In different aspects, a multi-channel telephony apparatus may include a sound interface configured to process a multi-channel sound signal including at least one of causing speakers to emit multi-channel sound or receiving multi-channel sound from microphones and a network interface configured to transmit the multi-channel sound signal from the sound interface to one or more communication lines of a telephone network. In some aspects, a dialer may be configured with the network interface to establish a connection with the telephone network.

In another aspect of the disclosure, an apparatus may include a communication processor operably connected to a telephone network configured as a multi-channel transport path. The apparatus may further include a sound interface for facilitating connections with two or more speakers and at least one microphone, and an audio processor in connection between the sound interface and the communication processor, the audio processor converting a communication signal from the communication processor to a sound signal for the sound interface.

In still another aspect of the disclosure, a method for providing multi-channel telephony may include connecting a multi-channel telephone to a multi-channel network using a call identifier, establishing a protocol between the multi-channel telephone and the network to facilitate provide at least two-channel sound to the multi-channel telephone, and providing multi-channel sound to the multi-channel telephone.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTIONS OF THE DRAWINGS

The detailed description is set forth with reference to the accompanying figures. In the figures, the left-most digit(s) of a reference number identifies the figure in which the reference number first appears. The same reference numbers in different figures indicate similar or identical items.

DETAILED DESCRIPTION

Overview

A communication system according to embodiments disclosed herein may more closely simulate an in-person conference setting. For example, a communication system may provide multi-channel sound to a listener by combining traditional public switch telephone network (PSTN) lines to transmit stereo sound between users in a telephone conference. The communication system may include a number of additional features to enhance the sound quality and the transmission of the audio signals between users conversing on the system.

Apparatus and techniques for providing multi-channel telephony are described herein. Many specific details of certain embodiments are set forth in the following description and in FIGS. 1 through 7 to provide a thorough understanding of such embodiments. Throughout the disclosure, several examples are described using stereo telephony, which is one example of multi-channel telephony. More generally, however, multi-channel telephony is intended to include providing communications using two or more channels to provide a user with a spatial aural presentation.

Figure 1:
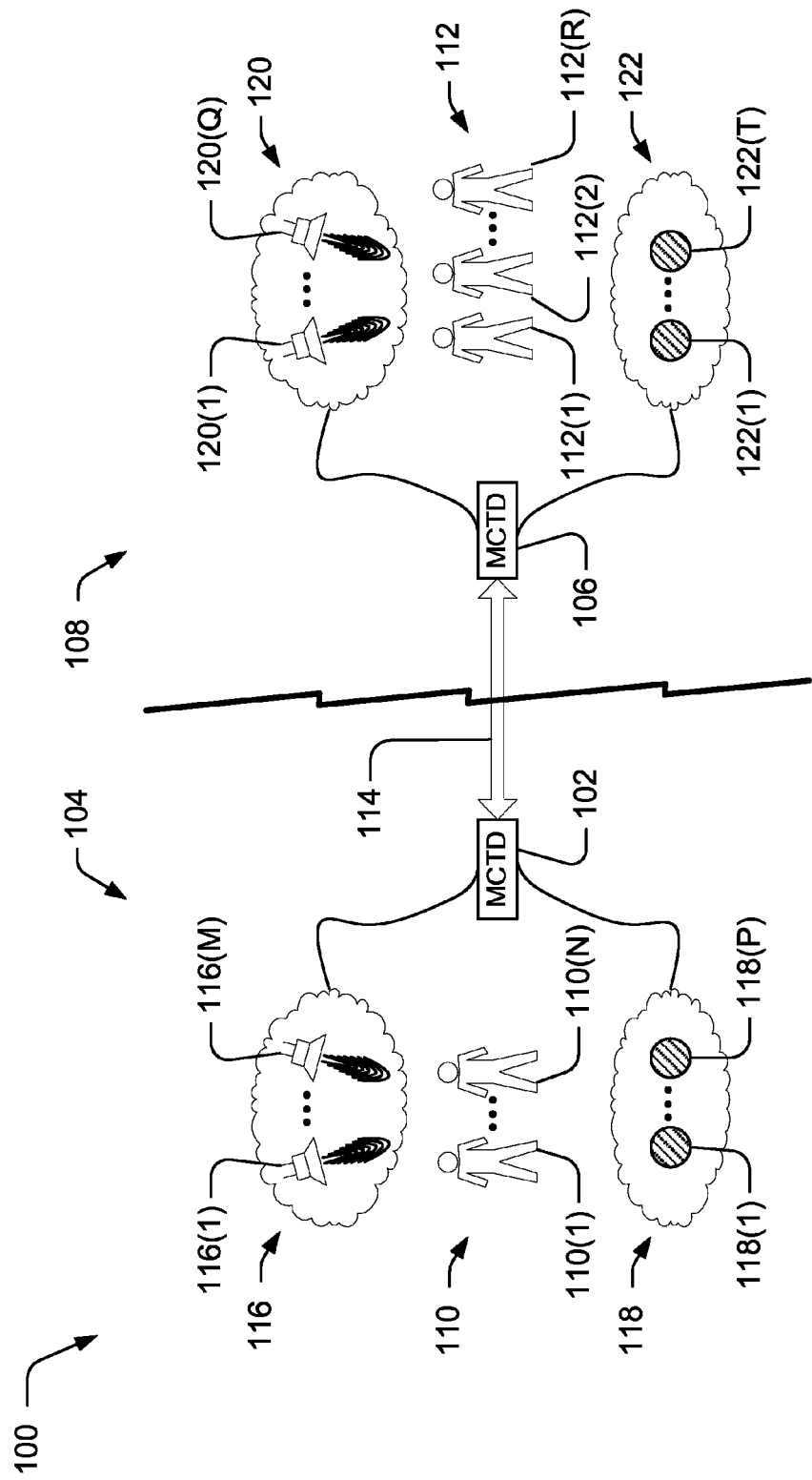
FIG. 1 is a schematic of an illustrative environment including multi-channel telephony.

FIG. 1 is a schematic of an illustrative environment 100 including users communicating using multi-channel telephony. The environment 100 includes a first multi-channel telephony device (or telephone) 102 at a first location 104 and a second multi-channel telephone 106 at a second location 108. The first and second multi-channel telephones 102, 106 facilitate a communication between a first set of users 110 and a second set of users 112, respectively. The first set of users 110 may include any number of users 110(1), . . . , 110(N), and accordingly the second set of users 112 may include users 112(1), . . . , 112(R). The first and second sets of users 110, 112 may communicate over a telephone network 114 or other communication system in multi-channel sound.

According to exemplary embodiments, the first multi-channel telephone 102 includes a first set of speakers 116 and a first set of microphones 118 while the second multi-channel telephone 106 includes a second set of speakers 120 and a second set of microphones 122 to facilitate communications between the first and second set of users 110, 112. Each set of speakers 116, 120 may include a plurality of speakers, such as speakers 116(1), . . . , 116(M) and 120(1), . . . , 120(Q), respectively. Similarly, each set of microphones 118, 122 may include a plurality of microphones, such as microphones 118(1), . . . , 118(P) and 122(1), . . . , 122(T), respectively.

In an illustrative communication in the environment 100, the first set of users 110 may only include the first user 110(1) while the second set of users 112 includes the users 112(1) and 112(2). The first user 110(1) may greet the second set of users 112 such as by stating, "Hi Bob and Ted." The first user's voice may be captured by the first set of microphones 118, processed and/or transmitted by the first multi-channel telephone 102 to the second multi-channel telephone 106, and emitted by the second set of speakers 120. In one instance, the sound captured by the microphone 118(1) may be transmitted via a first channel and emitted on the first speaker 120(1). Accordingly, the microphone 118(P) may transmit to the speaker 120(Q). The sound emitted by the second set of speakers 120 may provide a spatial aural presentation of the first user's location relative to the first set of microphones 118. Similarly, the second set of users 112 may reply to the first user, such as the user 112(1) may say, "Hello Tina" while the user 112(2) may say, "Good afternoon." The first user 110(1) may hear the communication from the second set of users 112 through speakers 116 such that the spatial configuration of the second set of users is represented. More specifically, the user 112(1) may emit sound primarily through the speaker 116(1) while the user 112(2) may emit sound primarily though the speaker 116(N), thus creating a spatial aural presentation of the second set of users 112 which may allow the first user 110(1) to more easily distinguish voices between the users 112(1), 112(2).

Multi-Channel Apparatus

Figure 2:
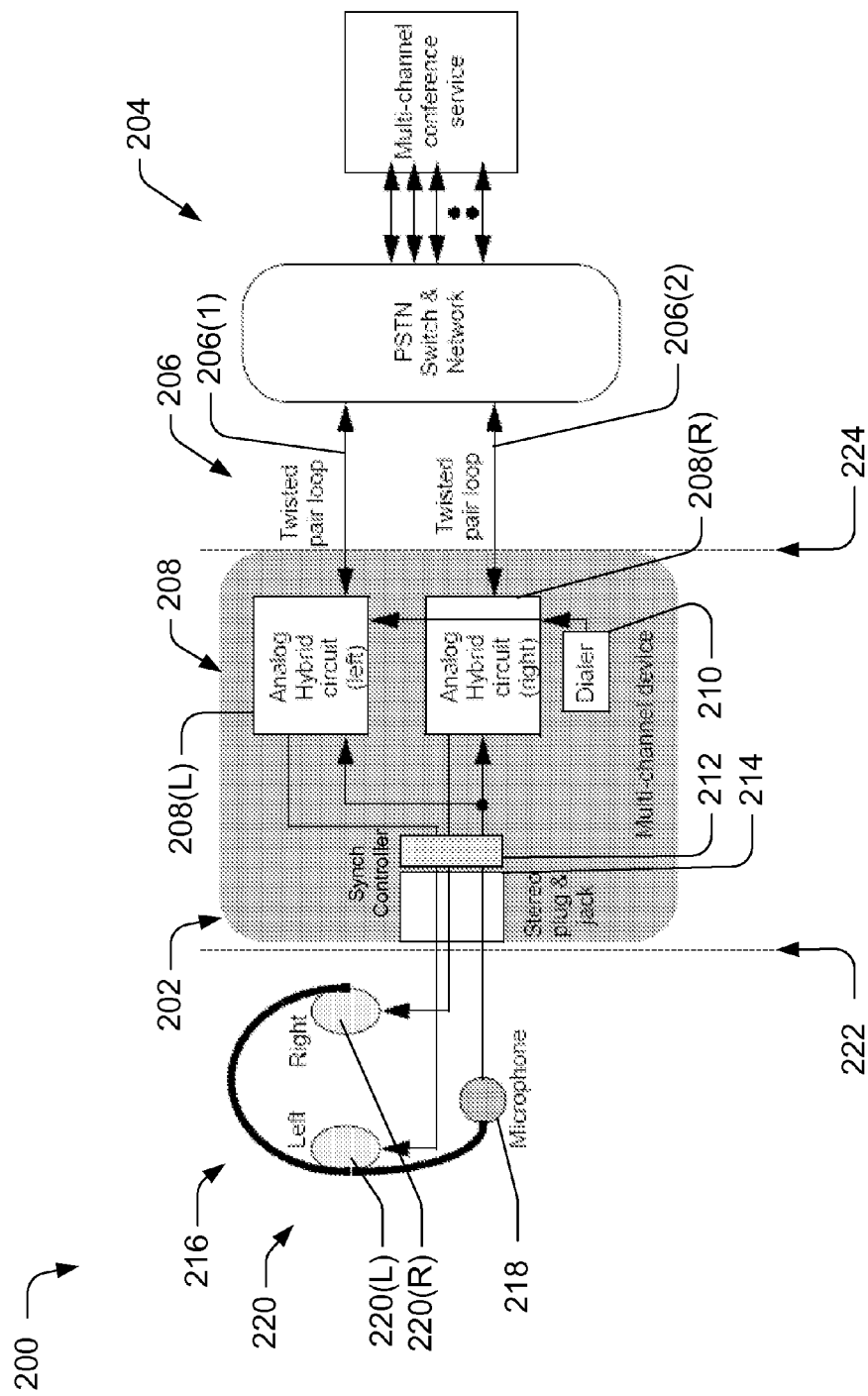
FIG. 2 is a block diagram of an illustrative architecture of a multi-channel telephony system.

FIG. 2 is a block diagram of an illustrative architecture 200 of a basic multi-channel telephony system. The architecture 200 includes a multi-channel telephone 202 and a telephone network 204. In some instances, the telephone network 204 may be a time-division multiplexed (TDM) digital network, including a PSTN, plain old telephone service (POTS), cellular network, integrated services digital network, or other TDM network, a combination of the foregoing, or the like. In one implementation, the connection between the multi-channel telephone 202 and the telephone network 204 may use multiple parallel transport paths, such as two or more PSTN telephone lines.

For example, the multi-channel telephone 202 may be connected to the PSTN using two twisted pair loops 206. Each twisted pair loop 206 may transmit a single channel of audio to and from the multi-channel telephone 202. In some instances, additional twisted pair loops may be used to transmit sound. Each twisted pair loop 206 may be in connection with an analog hybrid circuit (AHC) 208, such as a left AHC 208(L) and a right AHC 208(R). As known to those familiar with analog telephony, the AHC 208 may route the majority of the electrical signal from a microphone through the twisted pair loop 206 while routing a small portion of the electrical signal through a set of speakers back to the user. The AHC 208 allows the speaker to hear her own voice by transmitting it back to her speakers for a low volume projection known as "sidetone", while at the same time her voice is transmitted to remote listeners for a normal projection.

The multi-channel telephone 202 may also include a dialer 210 to facilitate completing a telephone call or other multi-channel telephony communication. The dialer 210 may be operably connected to the AHC 208. The dialer 210 may be configured to dial a single number to connect the caller. In some instances, the dialer 210 may have to dial multiple numbers to connect the caller, such as when the architecture 200 uses two twisted pair loops 206 in a PSTN. In such instances, the dialer 210 may dial a first number to complete a first connection (e.g., right channel) and dial a second number to complete a second connection (e.g., left channel), thus creating stereo sound through the two channels. The dialer 210 may include memory for storing numbers or dialing codes, and may include a user interface to facilitate user interaction.

A synchronization controller 212 may synchronize sound between two or more channels when sound is transmitted from multi-channel sources. For example, a first channel of sound (e.g., right channel) may be transmitted via a first twisted pair loop 206(1) while a second channel of sound (e.g., left channel) may be transmitted via a second twisted pair loop 206(2). When sound travels through the telephone network 204, it may travel via any number of routes, each route varying in distance and/or transmission time. Therefore, the sound from the first channel may be received before the sound from the second channel. The synchronization controller 212 may delay the sound from one or more channels to provide a substantially synchronized output of the sound by a set of speakers. In some instances, the synchronization controller 212 may facilitate manual adjustment of the sound synchronization. In this case, the user may be presented with a control input such as a knob, fader, or screen representation of such a device. The control input may introduce delay proportional to the control input position into the left channel and/or the right channel. To improve the sound when the initial synchronization is audibly wrong, the user may simply adjust the control input in one direction or the other until the perceived sound quality has been maximized. Additionally or alternatively, the synchronization controller 212 may automatically synchronize the sound between channels, such as by comparing the sounds from each channel through known methods of synchronization. In brief, a digital signal processor may sample signals from the left and right channels, compare the signals for similar sounds in both channels, and use the time difference between the similar sounds to automatically adjust the delay for the appropriate channel.

The multi-channel telephone 202 may include a sound interface 214 (e.g., stereo plug and jack) to enable the connection of a sound reproduction system 216 to the multi-channel telephone. In some instances, the sound interface 214 may be a multi-channel port such as a stereo jack, Ethernet connection, universal serial bus (USB) connection for connecting a portable or fixed sound reproduction system, such as the sound reproduction system 216, including speakers and/or microphones. In other instances, the multi-channel telephone 202 may include integrated speakers and/or microphones.

With continued reference to FIG. 2, the architecture 200 includes the illustrative multi-channel telephone 202 including the sound reproduction system 216 configured as a portable headset. As illustrated, the headset 216 may include a single microphone 218 to capture sound from a user and to provide an audio input to both the analog hybrid circuits 208. In other instances, each analog hybrid circuit 208 may include one or more microphones for capturing sound for transmission through the telephone network 204. The headset 216 may also be configured with speakers 220 including a left speaker 220(L) and a right speaker 220(R) in connection to the left AHC 208(L) and right AHC 208(R), respectively. The speakers 220 provide multi-channel sound providing a spatial aural presentation of sound captured by a speaker. In some instances, the speakers 220 and/or microphones 218 may be connected to the multi-channel telephone via a first wireless connection 222 (e.g., Wi-Fi, Bluetooth, etc.).

As previously mentioned, the multi-channel telephone 202 is in connection with the telephone network 204. In some instances, the multi-channel telephone 202 may be coupled to the telephone network 204 via a second wireless connection 224. For example, the multi-channel telephone 202 may connect to the telephone network 204 via a wireless telephone network (e.g., Global System for Mobile communication (GSM), General Packet Radio Service (GPRS), Universal Mobile Telecommunications System (UMTS), etc.), Wi-Fi, or any other wireless protocol. In some instances, the multi-channel telephone 202 may be connected to the telephone network 204 via a wired system such as by a twisted pair, coaxial cable, shielded audio cable, power line carrier, or other wired connection.

Figure 3:
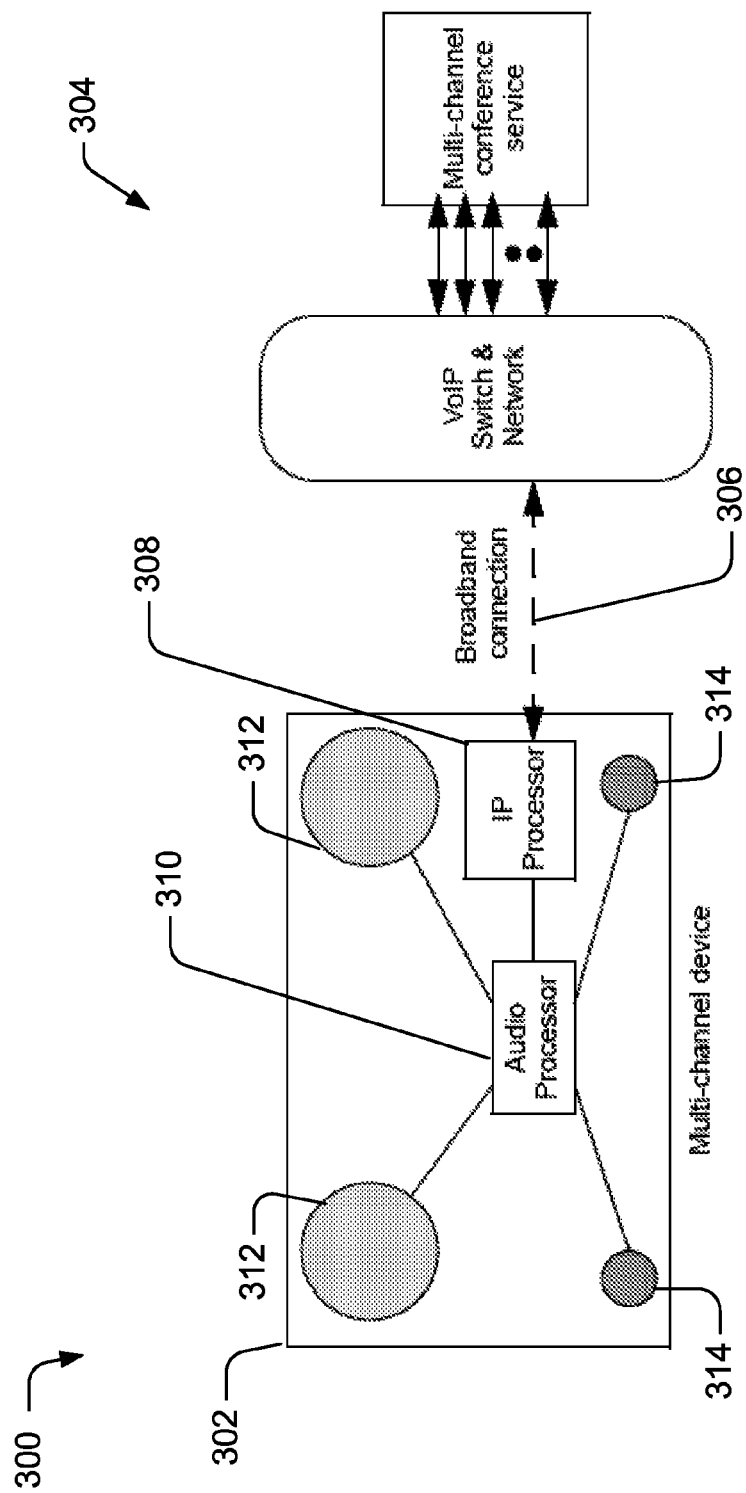
FIG. 3 is a block diagram of an illustrative architecture of another, more advanced multi-channel telephony system.

FIG. 3 is a block diagram of an illustrative architecture 300 of an advanced multi-channel telephony system. The architecture 300 includes a multi-channel telephone 302 in connection with a telephone network 304. The telephone network 304 may include a multi-channel transport path 306, such as a time-division multiplexed (TDM) or a channelized internet protocol connection. In some instances, the telephone network 304 may include, in whole or in part, a packet network such as voice-over-internet protocol (VoIP) network.

The multi-channel telephone 302 may include an Internet protocol (IP) processor 308 to process the signals to or from the multi-channel transport path 306. The IP processor 308 is operably connected to an audio processor 310. The audio processor 310 facilitates transmitting and/or receiving sound to or from speakers 312 and microphones 314, respectively. For example, the audio processor 310 may receive sound from the microphones 314 in multi-channel format, and process the sound for multi-channel transmission to the IP processor 308, which in turn processes the signals for multi-channel transmission via the multi-channel transport path 306.

Figure 4:
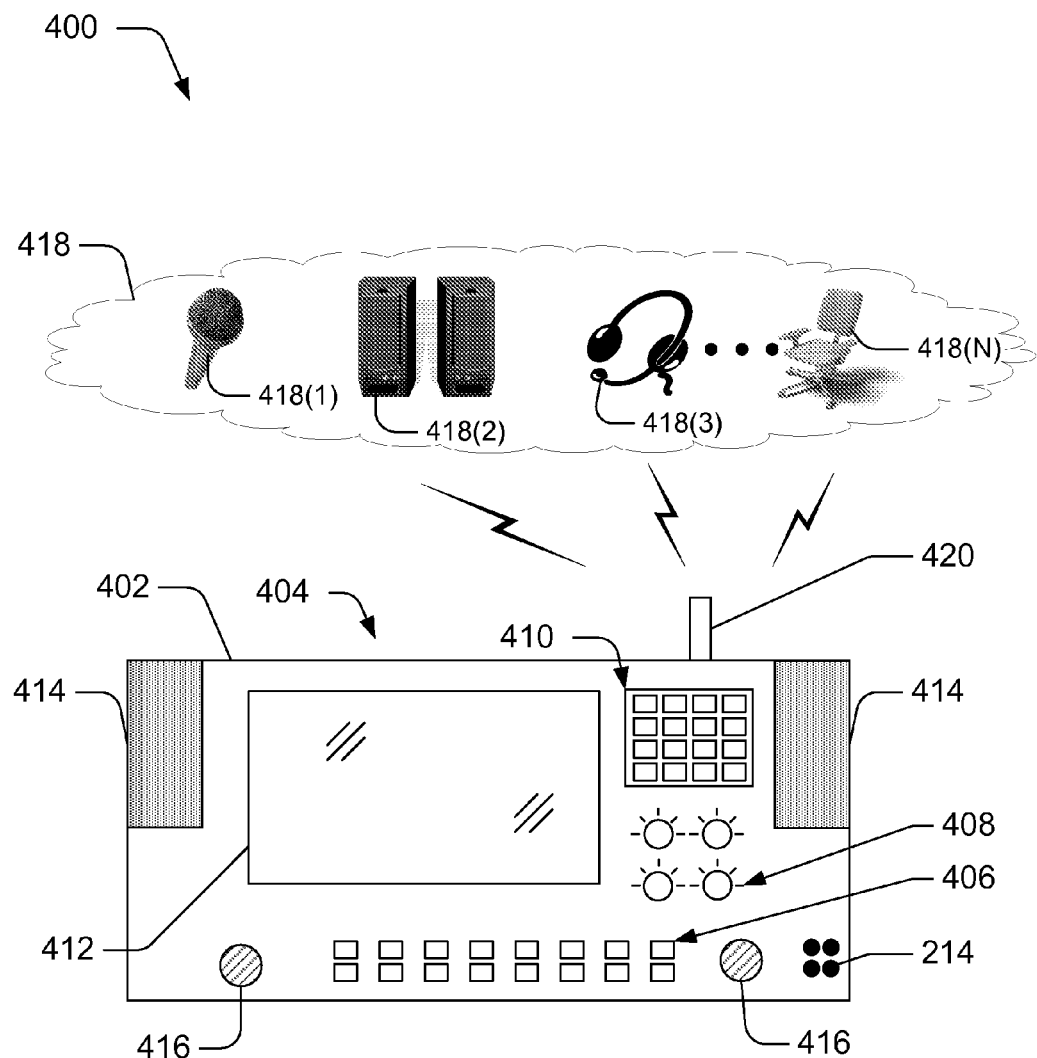
FIG. 4 is an illustrative apparatus for providing multi-channel telephony, according to an aspect of the disclosure.

FIG. 4 is an illustrative environment 400 including a multi-channel telephone 402 for providing multi-channel telephony according to an aspect of the disclosure. The multi-channel telephone 402 may include a number of inputs and outputs, collectively designated as a user interface 404. The user interface 404 may include, without limitation, a series of input keys 406, knobs 408 (e.g., for adjusting sound), and a numeric keypad 410 (e.g., configured for dialing telephone numbers or otherwise entering calling information). The multi-channel telephone 402 may also include a display 412 for presenting dialing and/or caller information, among other related information. The display 412 and the input keys 406 may enable a menu driven system for initiating and maintaining multi-channel telephony communications.

In some aspects, the multi-channel telephone 402 may include integrated speakers 414 and/or microphones 416 thus enabling multi-channel telephony. Additionally or alternatively, the multi-channel telephone 402 may include one or more remote or satellite speakers and/or microphones. In the illustrated embodiment, the speakers 414 may enable two channel sound (i.e., right and left signals), or more channels including channel configurations commonly designated 2.1, 5.1, 7.1, or any other configuration, where the number to the left of the decimal indicates the number of mid-frequency to high frequency channels and the number to the right of the decimal indicates a low frequency channel.

In one aspect, the multi-channel telephone 402 may be a hand-held device equipped with two or more of the speakers 414 oriented to present multi-channel output to a user and may include two or more of the microphones 416 to receive a multi-channel signal for transmission via a telephone network, such as the telephone network 114 shown in FIG. 1. In other aspects, the multi-channel telephone 402 may be configured as a mobile telephone. For example, the multi-channel telephone 402 may be configured as a portable pocket sized mobile telephone configured to connect to peripheral devices 418 to facilitate multi-channel telephony.

The peripheral devices 418 may be in connection to the multi-channel telephone 402 via a wireless connection, as discussed above, using an antenna 420 or may be in connection via the sound interface 214 (e.g., stereo plug and jack, USB). The peripheral devices 418 may include one or more microphones 418(1), speakers 418(2), headsets 418(3), and/or integrated sensory devices 418(N), among other possible peripheral devices. For example, the integrated sensory devices 418(N) may be a speaker or vibration-generating device mounted on a chair. In some instances, the headsets 418(3) may include an around-ear clip headset or hearing aid that inserts at least partially into a user's ear. In addition, the headsets 418(3) may include one or more microphones.

Operation

Figure 5:
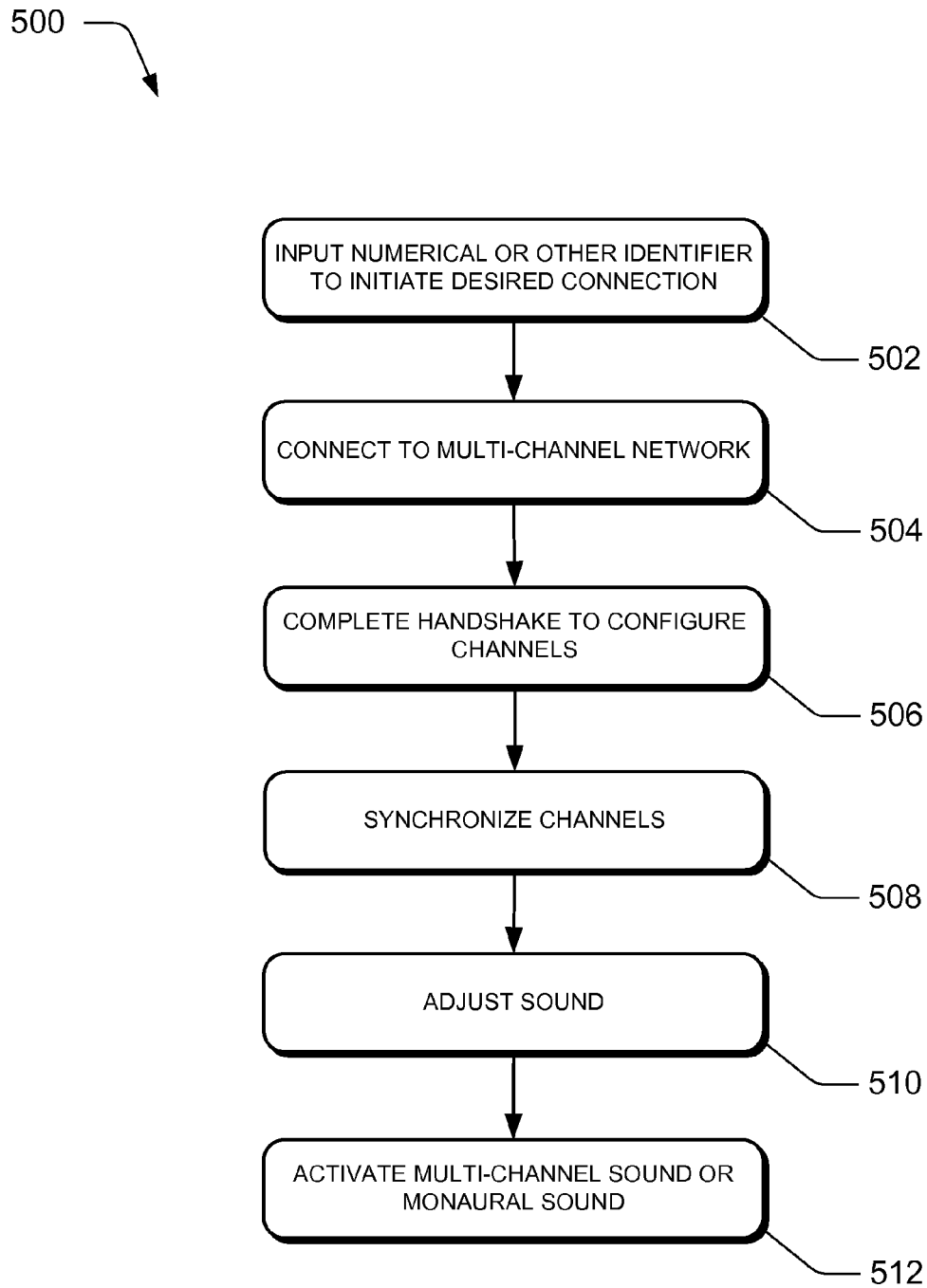
FIG. 5 is a flow diagram of an illustrative process of communication using a multi-channel telephony system.

FIG. 5 is a flow diagram of an illustrative process 500 of communication using a multi-channel telephony system. The process 500 includes a block 502 where a numerical input or other identifier is provided to initiate (e.g., dial) the desired connection to another communication device. For example, a user may input two telephone numbers, each corresponding to a PSTN line, using the dialer 210 on the multi-channel telephone 202 that uses two PSTN lines. The numerical input or other identifier may also be automated, such as to enable a single entry to connect multiple PSTN lines. Similarly, a number may be stored in an address book, or other known methods of dialing may be used to connect the multi-channel telephone 202 to another communication device. In a multi-channel network, a single address may be used such as a telephone number, uniform resource locator (URL), internet protocol (IP) address, or other identifier. At a block 504, the multi-channel telephone 202 may connect to a multi-channel network, such as a TDM network or a packet network.

At a block 506, the multi-channel telephone 202 may complete a handshake, or other configuration process, to configure the channels between the transmitting multi-channel telephone (transmitter) and the receiving multi-channel telephone (receiver). In a multi-channel network, user-to-network signaling may be used to specify the parameters of the multi-channel call such as number of channels, encoding scheme, channel assignments. For example, the transmitter may be enabled to provide 5.1 multi-channel sound to a user while a receiver may only be enabled to provide two channel sound. Therefore, the transmitter and the receiver may undergo a dynamic configuration process to determine how to best render the sound with the available resources (e.g., map microphones from one device to speakers on the other device). Algorithms which contain well-understood rules for channel mapping may be used, or an exchange of signaling messages may be used to configure the devices to provide the maximum multi-channel sound possible for each device. A lower-count channel device may be capable of using a higher-count channel connection using analog or digital signal processing to emulate the higher-count signal. For example, a device with two channel headphones may be able to connect to a 5.1 channel network source, and through the use of digital signal processing, delay, echo, and equalization, present a signal to the headphones that the user will perceive with more "depth" than the sound provided by a simple two channel mapping. Such channel mappings are known to those familiar with the design of multi-channel consumer audio systems.

In addition, the configuration process at the block 506 may include other configurations, such as processing sound quality for differences in network bandwidth, or other configurations to enable multi-channel telephony between the connecting devices. In some instances, the handshake may recognize the presence of a multi-channel capable device, such as the device 202, and, thus, connect the device in accordance with an established protocol.

At a block 508, the process 500 may synchronize the channels to account for any time delay in one or more channels. The sound may be further adjusted at a block 510, such as to change the tone or timbre of the sound, including volume, balance, or other aspects of the sound. The sound may also be enhanced at the block 510, either manually or automatically, such as by incorporating an aural-exciter or other sound enhancing techniques.

At the block 512, the process 500 may facilitate activation of multi-channel sound or monaural sound. For example, the multi-channel telephone 202 may be configured to switch between multi-channel sound and monaural sound (single channel sound) based on a user preference, subscription, or other determining factor. The switch may be initiated using a manual or automatic process. For example, if a network management system detects a heavy traffic load, the network may free up bandwidth by broadcasting a control signal to terminal devices to reduce network demand. One means of accomplishing such a reduction would be to reduce a multi-channel call to a single channel or monaural call.

Also, any of the acts described above with respect to the method 500 may be implemented by a processor or other computing device based on instructions stored on one or more computer-readable media associated with a multi-channel telephony system. Computer-readable media can be any available media that can be accessed locally or remotely by a multi-channel telephony system. By way of example, and not limitation, computer-readable media may comprise computer storage media such as volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a multi-channel telephony system. Combinations of the any of the above should also be included within the scope of computer-readable media.

Alternative Embodiments

Figure 6:
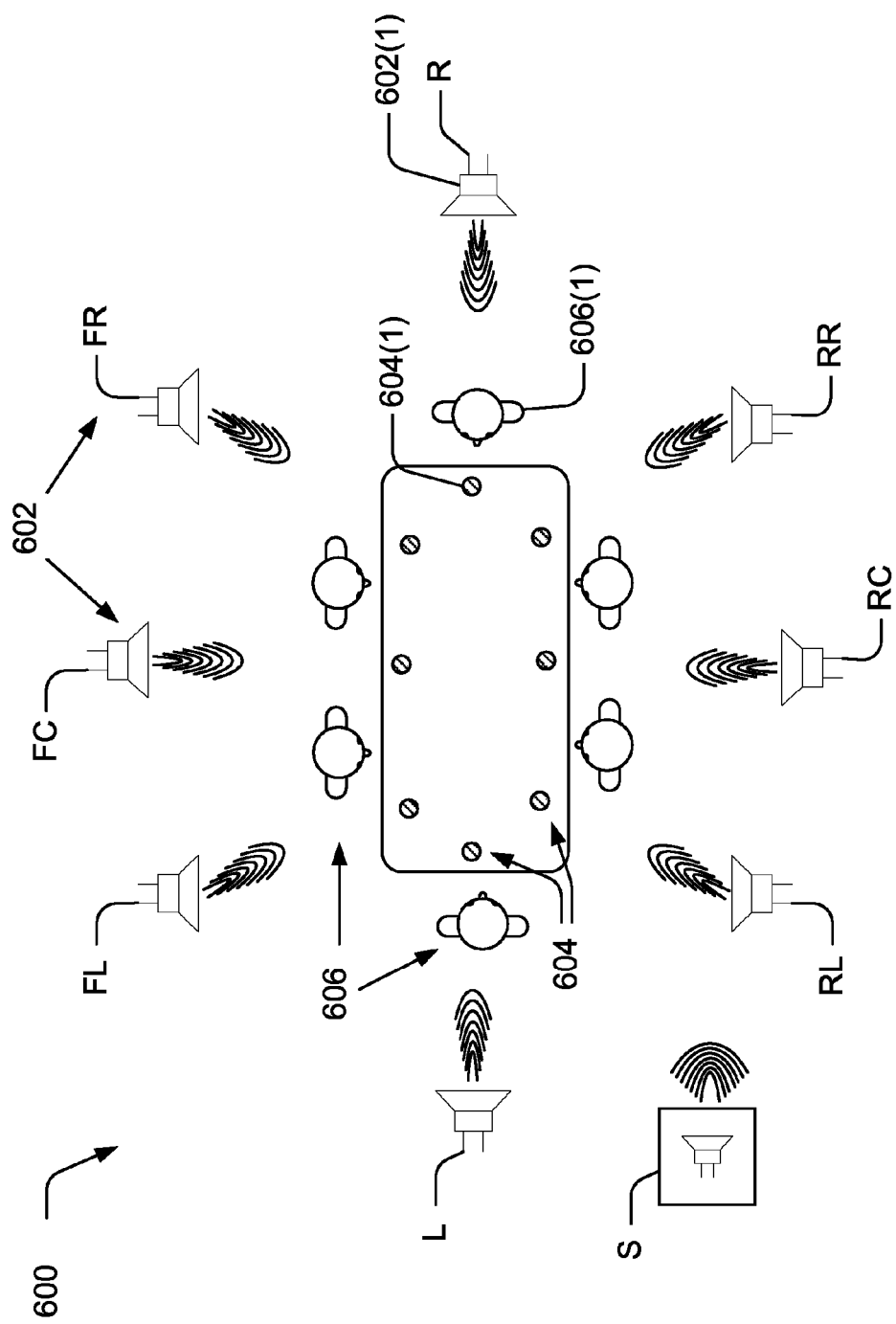
FIG. 6 is a schematic of an alternative configuration of a multi-channel telephony system configured for a conference, according to another aspect of the disclosure.

FIG. 6 is a schematic of an alternative configuration of a multi-channel telephony system configured for a conference according to another aspect of the disclosure. A multi-channel telephone architecture 600 may include a plurality of speakers 602 and microphones 604 situated around a conference table or other conference area. In some instances, the multi-channel telephone may be integrated into a conference facilitating device, such as a table, a conference room, or the like. The multi-channel telephone architecture 600 may be used to connect to another multi-channel telephone at a second location to facilitate a multi-channel communication such as a conference call. Sound from users 606 may be captured by the microphones 604, transmitted on separate channels, and emitted by one or more speakers in the second location. In an example, two similarly configured multi-channel telephones may be in connection between a first and second location. A first user 606(1) at the first location may make a sound captured by a microphone 604(1) which may in turn emit a sound on a speaker at the second location that is positioned similarly to a speaker 602(1) at the first location. This configuration may result in a spatial aural presentation at the second location that mimics the user arrangement at the first location.

Figure 7:
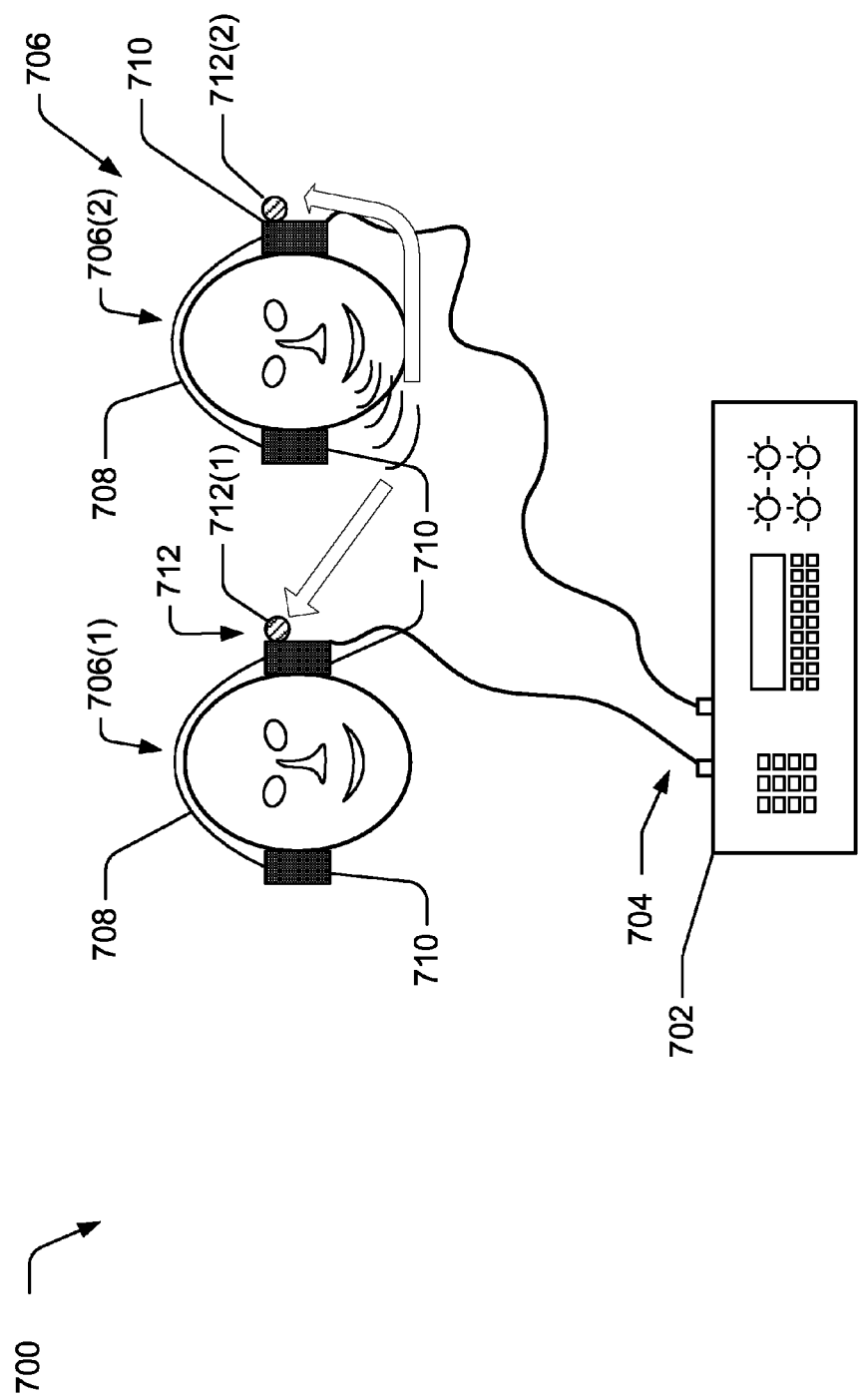
FIG. 7 is a schematic of another alternative configuration of a multi-channel telephony system including a multi-user headset configuration, according to still another aspect of the disclosure.

FIG. 7 is a schematic of another alternative configuration of a multi-channel telephony system including a multi-user headset configuration according to still another aspect of the disclosure. An environment 700 includes a multi-channel telephone 702 with a sound interface 704 for connecting a plurality of users 706. At least a portion of the users 706 may have headphones 708 with speakers 710 and microphones 712, however other configurations are contemplated. The speakers 710 and the microphones 712 are operably configured with the multi-channel telephone 702 (via wired or wireless connections).

The multi-channel telephone 702 is configured to receive and transmit multi-channel sound. For example, when a second user 706(2) is speaking, a microphone 712(2) may transmit a first channel sound while a microphone 712(1) (situated near a user 706(1)) may transmit a second channel sound, thus exaggerating spatial separation of the users 706 and providing a spatial aural presentation to listeners using a multi-channel telephone, such as the multi-channel telephone 702.

CONCLUSION

It is noted that the various modules shown herein may be implemented in hardware, software, or any combination thereof. Additionally, these modules are shown as separate items only for convenience of reference and description, and these representations do not limit possible implementations of the teachings herein. Instead, various functions described with these modules could be combined or separated as appropriate in a given implementation, without departing from the scope and spirit of the description herein.

Although techniques for providing multi-channel telephony have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A multi-channel telephony apparatus of a user at a first location communicating with a multi-channel telephone of first and second users at a second location, the multi-channel telephony apparatus comprising:

a sound interface configured to process a multi-channel sound signal by causing speakers to emit output multi-channel sound concurrently received at the first location on a first connection and a second connection from the multi-channel telephone and by receiving input multi-channel sound from microphones;
wherein the speakers comprise a first speaker and a second speaker for emitting the output multi-channel sound at the first location; and
a network interface configured with a dialer, wherein the dialer is configured to dial a first telephone number to complete the first connection with the second location having the first and the second users, and the dialer is configured to dial a second telephone number to complete the second connection with the second location having the first and the second users;
wherein the network interface is configured to transmit the input multi-channel sound from the sound interface to the multi-channel telephone at the second location through the first connection and the second connection on two communication lines of a telephone network;
wherein the first speaker primarily emits a first voice of the first user from the second location when the first user and the second user are speaking on the multi-channel telephone at the second location, in order to cause a spatial aural presentation via the first connection and the second connection;
wherein the second speaker primarily emits a second voice of the second user from the second location when the first user and the second user are speaking on the multi-channel telephone at the second location, in order to cause the spatial aural presentation via the first connection and the second connection;
wherein the spatial aural presentation on the first and the second speakers, of the first voice of the first user and the second voice of the second user speaking on the multi-channel telephone, is configured such that the user at the first location audibly distinguishes the first and the second voices of the first and the second users at the second location; and
wherein responsive to the network interface receiving a control signal to reduce network demand, the network interface is configured to automatically switch from the output multi-channel sound to output single channel sound corresponding to switching from a multi-channel call to a single call.

2. The apparatus of claim 1, wherein the telephone network is a time-division multiplexed digital network.

3. The apparatus of claim 1, further comprising an integrated microphone in connection to the sound interface.

4. The apparatus of claim 1, further comprising a wireless transceiver for connecting to the telephone network and the microphones.

5. The apparatus of claim 1, wherein the telephone network is a wireless mobile network.

6. The apparatus of claim 1, wherein the dialer enables connection to the two communication lines, each communication line having a unique calling identifier.

7. The apparatus of claim 1, further comprising a synchronization controller in connection between the network interface and the sound interface, the synchronization controller configured to synchronize the output multi-channel sound from the first and second connections transmitted to the first and second speakers by delaying the output multi-channel sound from the first connection in one event and the second connection in another event.

8. A multi-channel telephone of a user at a first location communicating with another multi-channel telephone of first and second users at a second location, comprising:
a sound interface configured to process a multi-channel sound signal by causing first and second speakers to emit output multi-channel sound concurrently received at the first location on a first connection and a second connection from the another multi-channel telephone; and
a network interface configured with a dialer, wherein the dialer is configured to dial a first telephone number to complete the first connection with the second location having the first and the second users, and the dialer is configured to dial a second telephone number to complete the second connection with the second location having the first and the second users;
wherein the network interface is configured to transmit an input multi-channel sound from the sound interface to the another multi-channel telephone at the second location through the first connection and the second connection on two communication lines of a telephone network;
wherein the first speaker primarily emits a first voice of the first user from the second location when the first user and the second user are speaking on the another multi-channel telephone at the second location, in order to cause a spatial aural presentation via the first connection and the second connection;
wherein the second speaker primarily emits a second voice of the second user from the second location when the first user and the second user are speaking on the another multi-channel telephone at the second location, in order to cause the spatial aural presentation via the first connection and the second connection;
wherein the spatial aural presentation on the first and the second speakers, of the first voice of the first user and the second voice of the second user speaking on the another multi-channel telephone, is configured such that the user at the first location audibly distinguishes the first and the second voices of the first and the second users at the second location; and
wherein responsive to the network interface receiving a control signal to reduce network demand, the network interface is configured to automatically switch from the output multi-channel sound to output single channel sound corresponding to switching from a multi-channel call to a single call.

9. The multi-channel telephone of claim 8, wherein the sound interface includes a plurality of speakers and a plurality of microphones.

10. The multi-channel telephone of claim 8, wherein the sound interface includes connections to connect peripherals.

11. The multi-channel telephone of claim 8, further comprising a wireless transceiver for connecting the telephone network and a peripheral device.

12. The multi-channel telephone of claim 8, wherein a sound processor is configured to provide a 5.1 channel of the output multi-channel sound to a plurality of speakers.

13. The multi-channel telephone of claim 8, wherein an audio processor is configured to enhance the output multi-channel sound including timbre effect, balance, and volume.

14. A method for a multi-channel telephone of a user at a first location communicating with another multi-channel telephone of first and second users at a second location, the method comprising:
configuring the multi-channel telephone to process a multi-channel sound signal by causing first and second speakers to emit output multi-channel sound concurrently received at the first location on a first connection and a second connection from the another multi-channel telephone; and
configuring the multi-channel telephone to dial a first telephone number to complete the first connection with the second location having the first and the second users, and to dial a second telephone number to complete the second connection with the second location having the first and the second users;

wherein the multi-channel telephone is configured to transmit an input multi-channel sound to the another multi-channel telephone at the second location through the first connection and the second connection on two communication lines of a telephone network;

wherein the first speaker primarily emits a first voice of the first user from the second location when the first user and the second user are speaking on the another multi-channel telephone at the second location, in order to cause a spatial aural presentation via the first connection and the second connection;

wherein the second speaker primarily emits a second voice of the second user from the second location when the first user and the second user are speaking on the another multi-channel telephone at the second location, in order to cause the spatial aural presentation via the first connection and the second connection; and wherein the spatial aural presentation on the first and the second speakers, of the first voice of the first user and the second voice of the second user speaking on the another multi-channel telephone, is configured such that the user at the first location audibly distinguishes the first and the second voices of the first and the second users at the second location;

wherein responsive to the multi-channel telephone receiving a control signal to reduce network demand, the multi-channel telephone is configured to automatically switch from the output multi-channel sound to output single channel sound corresponding to switching from a multi-channel call to a single call.

15. The method of claim 14, further comprising synchronizing signals received from the first connection and the second connection, the synchronization including delaying a sound signal.

16. The method of claim 14, further comprising adjusting sound from a signal reception, including timbre effect, balance, and volume.

* * * * *